United States Patent
Astafiev et al.

(10) Patent No.: US 7,443,720 B2
(45) Date of Patent: Oct. 28, 2008

(54) METHOD AND CIRCUIT FOR READING QUANTUM STATE

(75) Inventors: Oleg Astafiev, Ibaraki (JP); Yuri Pashkin, Ibaraki (JP); Jaw-Shen Tsai, Tokyo (JP)

(73) Assignees: Riken, Saitama (JP); NEC Corporation, Tokyo (JP)

( * ) Notice: Subject to any disclaimer, the term of this patent is extended or adjusted under 35 U.S.C. 154(b) by 519 days.

(21) Appl. No.: 11/203,376

(22) Filed: Aug. 15, 2005

(65) Prior Publication Data

US 2006/0033096 A1    Feb. 16, 2006

(30) Foreign Application Priority Data

Aug. 16, 2004   (JP)   ............... 2004-236515

(51) Int. Cl.
G11C 11/44   (2006.01)
G11C 11/24   (2006.01)
H03K 19/195   (2006.01)
H03K 17/04   (2006.01)

(52) U.S. Cl. ............. 365/162; 365/149; 326/1; 326/3; 327/366; 327/367

(58) Field of Classification Search ............ 365/149, 365/160, 162; 326/1, 3; 327/366, 367

See application file for complete search history.

(56) References Cited

U.S. PATENT DOCUMENTS

| | | | | |
|---|---|---|---|---|
| 7,145,170 B2 * | 12/2006 | Yamamoto et al. | ............ | 257/30 |
| 7,268,576 B2 * | 9/2007 | Amin | ............ | 326/3 |
| 2002/0121636 A1 * | 9/2002 | Amin et al. | ............ | 257/9 |
| 2003/0121028 A1 * | 6/2003 | Coury et al. | ............ | 717/138 |
| 2003/0207766 A1 * | 11/2003 | Esteve et al. | ............ | 505/190 |
| 2004/0016918 A1 * | 1/2004 | Amin et al. | ............ | 257/14 |
| 2004/0170047 A1 * | 9/2004 | Amin et al. | ............ | 365/145 |
| 2005/0062072 A1 * | 3/2005 | Yamamoto et al. | ............ | 257/222 |
| 2005/0082519 A1 * | 4/2005 | Amin et al. | ............ | 257/13 |
| 2005/0098773 A1 * | 5/2005 | Vion et al. | ............ | 257/9 |
| 2006/0151775 A1 * | 7/2006 | Hollenberg et al. | ............ | 257/14 |

FOREIGN PATENT DOCUMENTS

JP    2000-277723 A    10/2000
JP    2004-200579 A    7/2004

* cited by examiner

*Primary Examiner*—Ly D Pham
(74) *Attorney, Agent, or Firm*—Sughrue Mion, PLLC

(57) ABSTRACT

A single electron-transistor is used to read out charge states of two coupled qubits formed by two Cooper pair boxes. Detection is made about a gate voltage shift of the peak of the current that flows in the single electron transistor in accordance with the charge states. Since the current peak position varies depending on the particular charge state, all four charge states can be independently measured, or read out.

7 Claims, 4 Drawing Sheets

|00⟩

|01⟩

|10⟩

|11⟩

METHOD AND CIRCUIT FOR READING QUANTUM STATE

This application claims priority to prior Japanese patent application JP 2004-236515, the disclosure of which is incorporated herein by reference.

BACKGROUND OF THE INVENTION

The present invention relates to a quantum-state readout circuit (or a quantum computation device) and a quantum-state measurement method for reading or measuring the quantum states of coupled charge quantum bits (qubits).

The qubit is a quantum two-level unit expressed by two levels of a quantum, namely, |0>, and |1>. An arbitrary quantum state |ϕ> is expressed by a superposition of |0> and |1>, that is, $|\phi\rangle = \alpha|0\rangle + \beta|1\rangle$, where coefficients α and β satisfy the normalization condition $|\alpha|^2 + |\beta|^2 = 1$ ($|\alpha|^2$ and $|\beta|^2$ indicate the probabilities of assuming the quantum levels |0> and |1>, respectively). These states (i.e., the energy levels) can be externally controlled with, for example, non-adiabatic pulses or microwaves.

In recent years, attempts have been made to configure or implement quantum computers by utilizing the qubits. It is expected that quantum computers utilizing qubits can solve problems that are practically unsolvable with conventional computers due to an enormous amount of computation.

For configuration of the quantum computers, there is a need to develop a quantum computation device for reading and outputting computational results.

For example, Patent Document 1 (Japanese Unexamined Patent Application Publication (JP-A) No. 2000-277723) discloses a quantum computation device. This quantum computation device includes an opposing electrode, a quantum box electrode opposed to the opposing electrode with a first tunnel barrier interposed therebetween, and a probe electrode connected to the quantum box electrode with a second tunnel barrier interposed therebetween. A gate electrode is coupled to the quantum box electrode with a gate capacitor interposed therebetween. In this case, the quantum box electrode and the opposing electrode are formed of superconducting material to act as a superconducting box electrode and a superconducting opposing electrode, respectively.

In the disclosed quantum computation device, the superconducting box electrode and the superconducting opposing electrode, which are provided across the first tunnel barrier, constitute a qubit section. Controlling a gate voltage applied to the gate terminal allows the state in the qubit section to be read out to the probe electrode via the second tunnel barrier. In this case, Cooper electron pairs move coherently by tunneling between the opposing electrode and the superconducting box electrode and between the superconducting box electrode and the probe electrode, so that the Cooper electron pairs are read out from the probe electrode. In this configuration, after the completion of readout of a Cooper electron pair, an initial state is automatically prepared. Thus, repeating the same computation and readout can cause direct current to be output. Thus, when this configuration is used, a readout circuit averages quasiparticles (Cooper pairs), extracted by the tunneling of the charge states of Cooper pairs in the superconducting box electrode, many times, to thereby provide detectable current.

Patent Document 1 discloses, as a related technology, a quantum computation device in which a readout circuit including a single-electron transistor (SET) is coupled to the superconducting box electrode via a capacitor. In this case, the single-electron transistor includes an island electrode, which is electrostatically coupled to the qubit section via a capacitor, and source and drain electrodes, which are connected to the island electrode via the corresponding tunnel barriers.

In this configuration, the state in the qubit section is transmitted to the island electrode via the readout capacitor and is read out as a change in a current value between the source electrode and the drain electrode. Such a quantum computation device having a readout circuit has a problem in the readout operation and speed.

Patent Document 2 (Japanese Unexamined Patent Application Publication (JP-A) No. 2004-200579) discloses another example of a quantum computation device having a readout circuit. The disclosed quantum computation device includes a qubit structure and a single electron transistor, which is provided so as to serve as a readout circuit. The qubit structure includes a quantum box electrode and an opposing electrode, which is coupled to the quantum box electrode with a first tunnel barrier interposed therebetween. Further, a trap electrode is coupled to the quantum box electrode with a second tunnel barrier interposed therebetween and is also coupled electrostatically to the island electrode of the single electron transistor via a capacitor. It has been pointed out that this configuration allows the readout of a quantum state by a single trial.

Patent Documents 1 and 2 disclose computation and readout of only a single qubit formed of a Cooper pair box. However, in order to achieve more realistic development of quantum computers, rather than a single qubit formed of a Cooper pair box, a requirement would be made about a technology for measuring or reading the states of two qubits (i.e., coupled qubits) by a single trial. Herein, it is to be noted that the double-qubit state can be expressed by a superposition of four states, namely, |00>, |10>, |01>, and |11>.

Conventionally, however, measurement, or readout, of double qubits has not been discussed. Additionally, the reality is that separating double-qubit states by a single trial has also not been studied.

SUMMARY OF THE INVENTION

One object of the present invention is to provide a readout circuit that can measure, or read out, double qubits.

Another object of the present invention is to provide a readout method that can distinguish and read available four states of double qubits.

According to the present invention, there is provided a quantum-state readout circuit comprising two Cooper pair boxes, two capacitors that are coupled to the two Cooper pair boxes, respectively, and reading means that is coupled to the capacitors and that comprises a single-electron transistor.

In the quantum-state readout circuit described above, two Cooper pair boxes may be coupled to each other by a capacitor.

In the quantum-state readout circuit described above, the two Cooper pair boxes may be coupled to each other by an inductor.

In the quantum-state readout circuit described above, the single-electron transistor may comprise an island electrode, a source electrode and a drain electrode that are coupled to the island electrode through respective tunnel junctions, and a gate electrode. In this case, the two capacitors are connected to the island electrode.

In the quantum-state readout circuit described above, states in the two coupled qubits may be detected as current flowing in the SET In this case, each of the four charge states is detected as a current peak shift along the gate voltage corresponding to the states of the qubits.

In the quantum-state readout circuit described above, the two capacitors coupled to the two Cooper pair boxes must have capacitances that are different from each other.

The quantum-state readout circuit described above may further comprise a detecting circuit which is connected to the SET to detect four states of double qubits expressed by |00>, |10>, |01>, and |11>.

According to the present invention, there is also provided a quantum-state readout method comprising a first step of preparing certain charge states of two coupled qubits and converting charge states in the Cooper pair boxes into physical quantities in accordance with the prepared charge states, the physical quantities being capable of assuming values that are different from each other, and a second step of reading out the charge states in the qubits by observing the physical quantities.

In the quantum-state readout method described above, all the charge states of the qubits are defined by different configurations of Cooper pairs.

In the quantum-state readout method described above, in the first step, the two Cooper pair boxes may be coupled to a single electron transistor via respective capacitors. The charge states in the two Cooper pair boxes are converted into current and are converted into, as the physical quantities, a gate voltage shift corresponding to the quantum state.

The present invention can facilitate the fabrication of a quantum readout circuit or quantum computation device that is essential for configuration of quantum computers and that is capable of separating the four states of double qubits by a single trial to measure and read the states.

DESCRIPTION OF THE PREFERRED EMBODIMENT

Basic Processing for Qubit

Figure 1A:
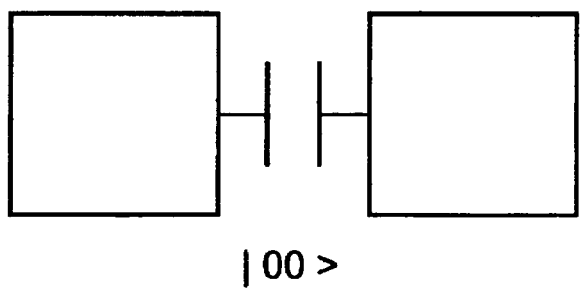
FIGS. 1A, 1B, 1C, and 1D are schematic diagrams illustrating possible four charge states of double qubits measured, or read out, in the present invention.

Now, description will be made about qubit processing, which provides a basis for the present invention. First, regardless of the type of qubit, each qubit is processed in three major steps involving initialization, manipulation, and readout. In the first step, a pre-determined initial state is prepared from which evolution of a quantum state begins. Of two energy levels, a low energy level (i.e., a state |0>) is typically used as the initial state.

In the manipulation of the quantum state in the second step, degeneration is caused between two states, i.e., energies of two different levels are equalized during time $\Delta t$. During the time, the system coherently oscillates between two quantum levels |0> and |1>. The oscillation frequency is determined by the coupling energy between the levels |0> and |1>. This process is called "quantum state evolution". When the evolution is stopped by terminating the pulse or turning off microwaves, a superposed state $\alpha|0>+\beta|1>$, where coefficients $\alpha$ and $\beta$ depend on $\Delta t$ and system parameters, is obtained. After the evolution, when measurement is performed, the system assumes |0> or |1> with probabilities $|\alpha|^2$ and $|\beta|^2$, respectively.

For a qubit based on a Cooper pair box, the states |0> and |1> correspond to Cooper pair box states 0 and 1. The states are manipulated by applying non-adiabatic pulses to a gate capacitatively coupled to the box. After the termination of the pulses, a superposition of two charge states is obtained. In order for the system to recognize the type of quantum state after the termination of the pulses, there is a need to check whether or not a Cooper pair is contained.

To this end, the third step is carried out so as to read a qubit. Probe readout used for reading out a charge qubit will be described below.

In a probe readout scheme, a supplemental electrode, i.e., a probe, is connected to a Cooper pair box via a tunneling junction. This probe is constantly maintained at a certain voltage and Josephson-quasiparticle (JQP) current is supplied through the probe. The JQP current is generated as a result of the following two sequential processes. That is, the first process depends on a current resulting from resonant tunneling of a Cooper pair flowing from a reservoir to the box via the Josephson junction and the second process depends on a current resulting from two-quasiparticle tunneling from the Cooper pair box to the probe.

The Cooper pair tunneling is a coherent process. The resonant condition for the process is produced by pulses during time $\Delta t$. Net charge of 2e is transferred during one-cycle time. Transferred charge is measured as current passing through the probe, i.e., as $I=2e/tm$, where tm indicates the measurement time of a current amplifier. When the measurement time is $10^{-3} \ldots 10^{-2}$S, corresponding current becomes $10^{-17} \ldots 10^{-16}$ A. This current cannot be measured with a presently available current amplifier. This readout scheme cannot achieve single-event measurement, but can measure the probability of the state |1>.

Application to Double Qubits

When the above-described scheme is applied to coupled qubits, i.e., two quantum bits (double qubits), current in the probe provides information regarding the probability for each qubit having a Cooper pair.

Figure 1B:
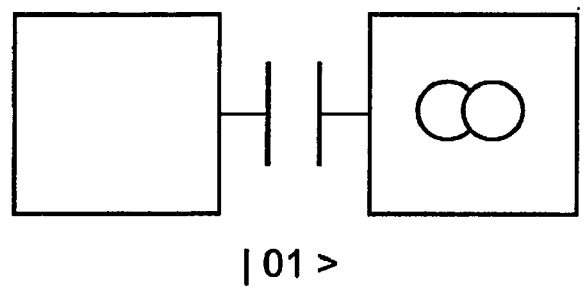
Figure 1C:
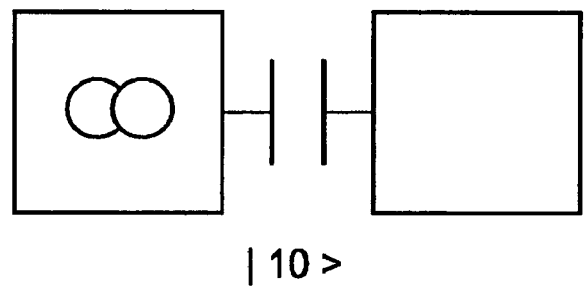
Figure 1D:
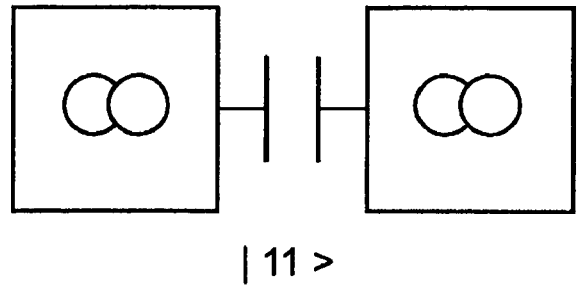

Now, a specific description will be given with reference to FIGS. 1A, 1B, 1C, and 1D. As shown, double qubits can take four states, depending on the presence/absence of a Cooper pair or pairs in two Cooper pair boxes (i.e., quantum box electrodes) coupled by a capacitor. That is, in the absence of a Cooper pair in two Cooper pair boxes, the double qubits are in an energy state (i.e., a charge state) expressed by |00>, as shown in FIG. 1A. In the presence of a Cooper pair in either of the Cooper pair boxes, the double qubits are in energy states (i.e., charge states) expressed by |01> and |10>, respectively, as shown in FIGS. 1B and 1C. In addition, in the presence of Cooper pairs in two Cooper pair boxes, the double qubits are in an energy state |11>, as shown in FIG. 1D.

In general, the state of double qubits is expressed by a superposition of the four states, i.e., $c_1|00>+c_2|10>+c_3|01>+c_4|11>$. The states shown in FIGS. 1B, 1C, and 1D can be produced by causing quantum oscillation to occur and by introducing the Cooper pair or pairs into the Cooper pair boxes via tunnel barriers through tunneling.

In practice, however, it is difficult to independently separate the states shown in FIGS. 1A, 1B, 1C, and 1D and to read out the states with a single trial by using a probe. Consequently, the practical application of readout of double qubits has not been realized.

Readout of Double Qubits

Figure 2:
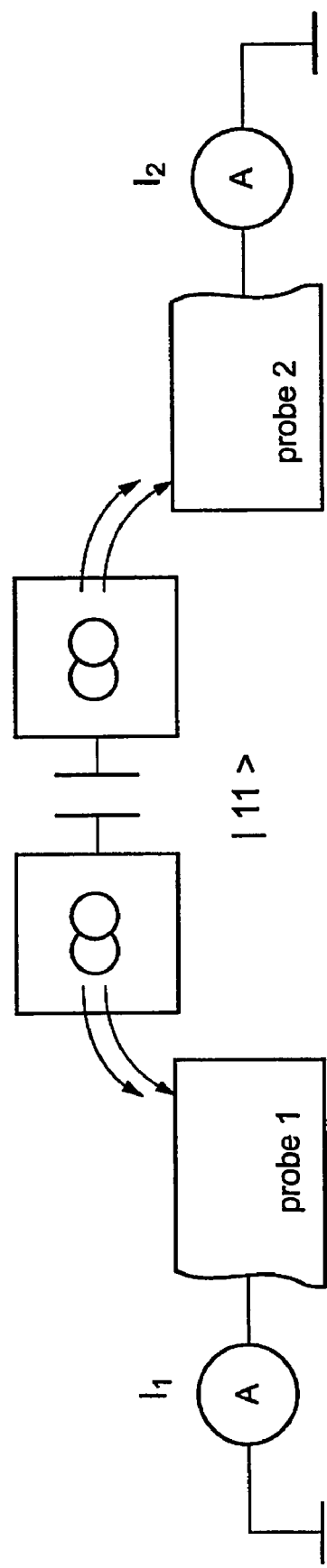
FIG. 2 is a diagram illustrating a problem caused to occur when double qubits are read.

FIG. 2 shows a configuration in which a first probe 1 and a second probe 2 are connected to the respective Cooper pair boxes shown in FIG. 1. The states of charges in the Cooper pair boxes are detected by detecting current. For example, when current $I_1$ flows to the first probe 1 as a result of collapse of a first qubit containing a Cooper pair, the single Cooper pair in the first qubit involves two double-qubit charge states, i.e., |10> and |11>, both of which contribute to current $I_1$. On the other hand, when current $I_2$ flows to the second probe 2 as a result of collapse of a second qubit, similarly, the states |01> and |11> contribute to current $I_2$. As is clear from this explanation, although information regarding combinations of the states can be obtained by the measurement of only current $I_1$ and $I_2$, information regarding the four charge states cannot be independently obtained.

Embodiment of Present Invention

Figure 3:
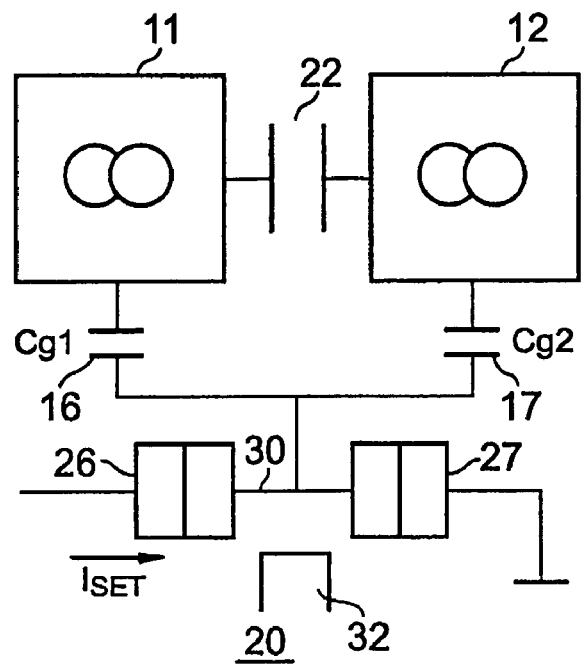
FIG. 3 is a block diagram illustrating coupled qubits and a readout circuit according to an embodiment of the present invention.

Referring to FIG. 3, description will be made about the principle of a readout circuit according to one embodiment of the present invention. A quantum readout circuit shown in FIG. 3 includes two Cooper-pair boxes 11 and 12, two capacitors 16 and 17 that are coupled to the respective Cooper-pair boxes 11 and 12 and that have capacitances different from each other, and a single-electron transistor (SET) 20 that is coupled to both the capacitors 16 and 17. The single-electron transistor 20 serves as a readout section. In the illustrated example, the two Cooper-pair boxes 11 and 12 are coupled by a capacitor 22. The capacitors 16 and 17 have respective capacitances $C_{g1}$ and $C_{g2}$ different from each other and $C_{g2}$ is equal to $2C_{g1}$ in this case. In other words, because the capacitors 16 and 17 have different capacitances, the SET is coupled to qubits asymmetrically.

The illustrated single-electron transistor 20 has a source electrode 26 and a drain electrode 27, which are connected to an island electrode 30 via respective tunnel barriers. The two capacitors 16 and 17 are coupled to the island electrode 30.

With this arrangement, detecting electrical current in the single electron transistor 20 by a single event measurement, i.e., a single trial, allows individual qubits (i.e., Cooper pairs) in the two Cooper-pair boxes 11 and 12 to be measured, or read out.

In this case, of double qubits, the coupling strength of one qubit is different from the coupling strength of the other qubit. For example, the coupling strength of a first qubit is half the strength of a second qubit. Thus, when a double-qubit state is detected, the peak of output current $I_{set}$ appears at a different gate voltage in accordance with a different charge state.

When this principle is used to measure a shift in a gate voltage at a gate electrode 39, arranged adjacent to the island electrode 30 of the SET 20, and current flowing in the SET 20, it is possible to individually and separately read out the above-described four charge states.

Figure 4:
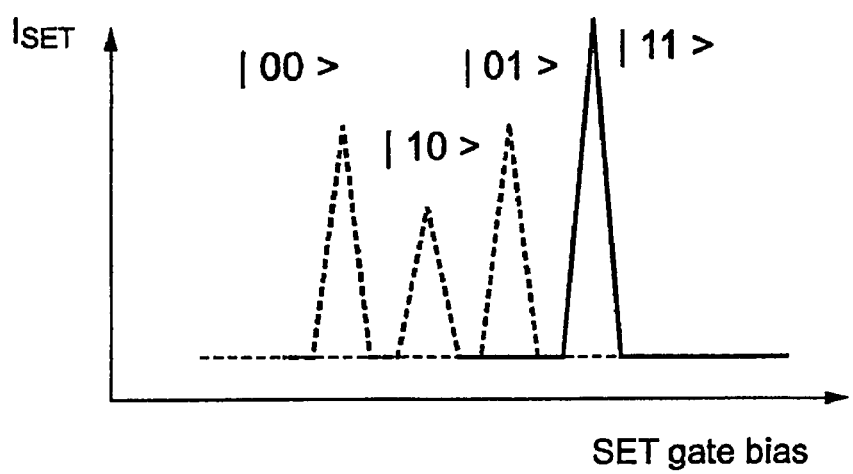
FIG. 4 is a graph illustrating the principle of the readout circuit shown in FIG. 3.

FIG. 4 shows a current $I_{set}$ flowing in the SET 20 versus bias voltage at the gate electrode 39 of the SET 20. As is clear from FIG. 4, the peaks of current $I_{set}$ shift along the gate voltage in accordance with the four states |00>, |10>, |01>, and |11> and the shift in the gate bias voltage is peculiar to double qubits. That is, FIG. 4 shows a relationship in which, as the gate bias voltage increases, the peak of current $I_{set}$ shifts in the order of the states |00>, |10>, |01>, and |11>.

More specifically, when a relationship between the shift in the gate voltage and the capacitance is considered, the gate voltage does not shift in the state |00>. When $C_{g1}$ and $C_{1\Sigma}$ are assumed to represent the coupling capacitance and the total capacitance of the first qubit, respectively, the SET gate voltage shifts by an amount of $C_{g1}\Delta Vg/C_{1\Sigma}$ in the state |10>.

In the state |01>, when $C_{g2}$ and $C_{2\Sigma}$ are assumed to represent the coupling capacitance and the total capacitance of the second qubit, respectively, the SET gate voltage at the SET 20 shifts by an amount of $C_{g2}\Delta Vg/C_{2\Sigma}$. This shift is twice as large as the shift in the state |10>. This is because $C_{g2}$ is equal to $2C_{g1}$ and all the capacitances of the qubits are equal. Eventually, in the state |11>, a shift expressed by $(C_{g1}/C_{1\Sigma}+C_{g2}/C_{2\Sigma})\Delta Vg$ is given. As described above, since the two capacitors 16 and 17 have different capacitances, the four quantum states can be detected based on a shift in the SET gate voltage.

As described above, according to the present invention, all four charge states in two Cooper pair boxes can be separated in a distinct manner. A requirement for the separation is that a half-width of the SET 20 current peak does not exceed $C_{g1}\Delta V_g/C_{1\Sigma}$, where $V_g$ is the modulation period of the SET. This requirement is feasible in practice.

The method according to the present invention can be generalized for a case of a large number of qubits. An advantage of this method is that the use of only a single SET makes it possible to measure probabilities of the quantum states of a large number of qubits without measurement of a single event.

FIRST EXAMPLE

Figure 5:
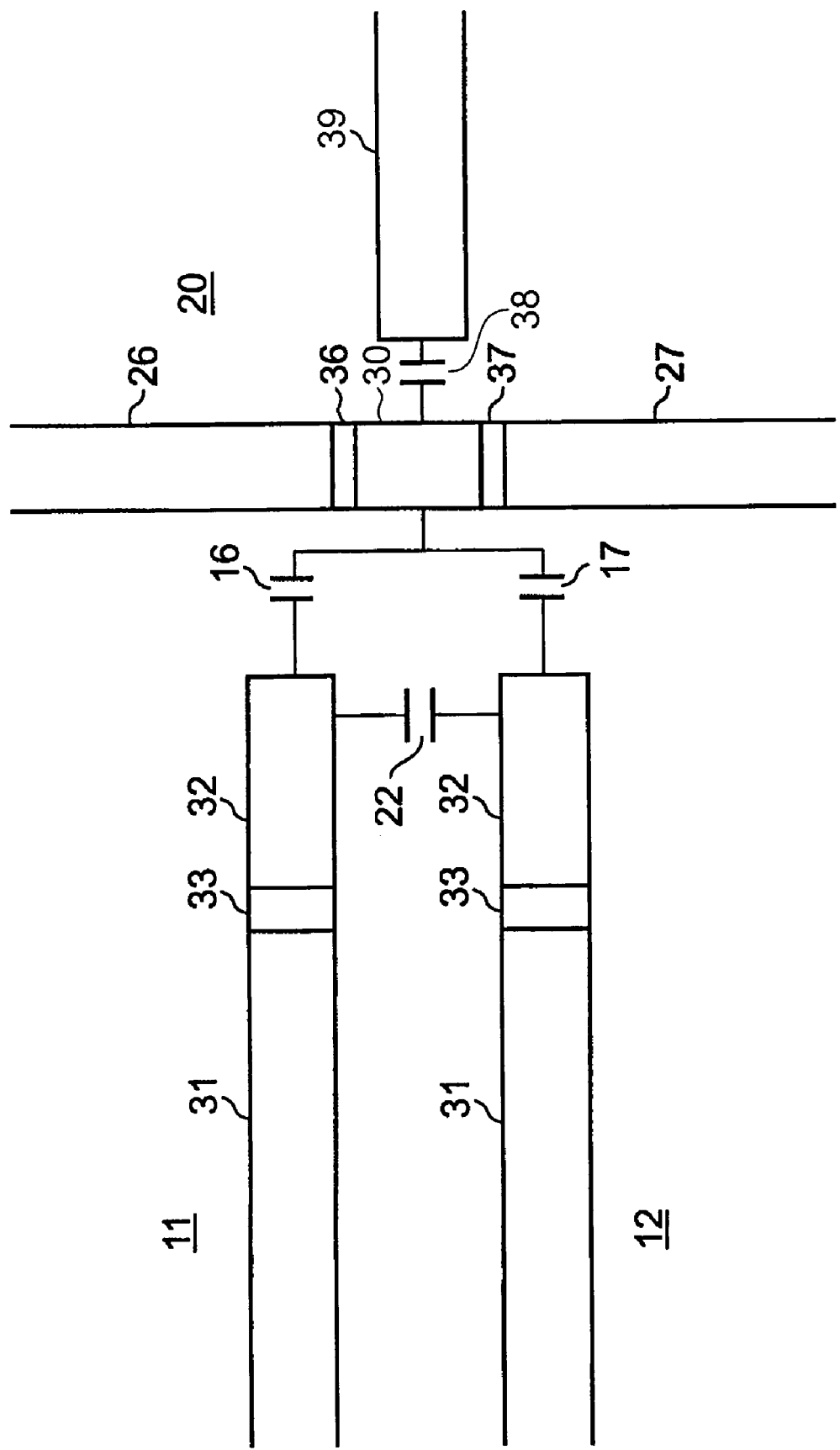
FIG. 5 is a diagram illustrating coupled qubits and a readout circuit according to an example of the present invention.

FIG. 5 shows a quantum computation device, i.e., two couple qubits, and a readout circuit, according to one example of the present invention. Sections corresponding to the sections shown in FIG. 3 are denoted by the same reference numerals. In the illustrated example, two Cooper-pair boxes 11 and 12 each include an opposing electrode 31, a superconducting box electrode 32, and a tunnel barrier 33 provided between the opposing electrode 31 and the superconducting box electrode 32. The two superconducting box electrodes 32 are capacitatively coupled to each other by a capacitor 22. Additionally, an SET 20 serves as a readout section and includes a source electrode 26, a drain electrode 27, and an island electrode 30. A first tunnel barrier 36 is provided between the source electrode 26 and the island electrode 30 and a second tunnel barrier 37 is provided between the drain electrode 27 and the island electrode 30.

The illustrated SET 20 has the gate electrode 39, which is coupled to the island electrode 30 via a gate capacitor 38. The two superconducting box electrodes 32 are coupled to the island electrode 30 via capacitors 16 and 17, respectively.

In this configuration, Cooper pairs charged as a result of computation are supplied due to quantum oscillations from the opposing electrodes 31 to the superconducting box electrodes 32 of the Cooper pair boxes 11 and 12 via the tunnel barriers 33. Consequently, the superconducting box electrodes 32 are put into any of the states shown in FIGS. 1A, 1B, 1C, and 1D or in their superposition. The superconducting box electrodes 32 are coupled to each other by the capacitor 22, which coupling produces a double-qubit state.

The charge states in the superconducting box electrodes 32 are sensed by the island electrode 30 via the capacitors 16 and 17. The sensed states are read out as current $I_{set}$ flowing between the source electrode 26 and the drain electrode 27.

In this example, as shown in FIG. 4, the current peak of the SET 20 is shifted by an amount corresponding to the charge state of both superconducting box electrodes 32. Thus, detecting the shift allows double qubits states to be detected with a single trial, i.e., with a single event measurement. When a detecting circuit for detecting a gate bias voltage is connected to the gate electrode 39 in order to detect a gate-bias voltage shift, the states of double qubits can be detected in accordance with the detected gate bias voltage.

The present invention is applicable to not only double-qubit readout but also double-qubit measurement, thereby making it possible to provide a significant technology for developing a quantum computer. In the examples shown in FIGS. 3 and 5, although the above-description has been restricted to the case where two Cooper box electrodes 11 and 12 are coupled by the capacitor 22, they may be coupled by an inductor instead of the capacitor 22. Such an arrangement can provide the same advantages as described above, with the same operation.

What is claimed is:

1. A quantum-state readout circuit comprising:
   two Cooper pair boxes;
   two capacitors that are coupled to the two Cooper pair boxes, respectively; and
   reading means that is coupled to the capacitors and that comprises a single-electron transistor,
   wherein the two capacitors coupled to the two Cooper pair boxes have capacitances that are different from each other.

2. The quantum-state readout circuit according to claim 1, wherein the two Cooper pair boxes are coupled to each other by a capacitor.

3. The quantum-state readout circuit according to claim 1, wherein the two Cooper pair boxes are coupled to each other by an inductor.

4. The quantum-state readout circuit according to claim 1, wherein the single-electron transistor comprises an island electrode, a source electrode and a drain electrode that are coupled to the island electrode through respective tunnel junctions, and a gate electrode, wherein the two capacitors are connected to the island electrode.

5. The quantum-state readout circuit according to claim 4, wherein states in the two Cooper pair boxes are detected as variations of current flowing through the single-electron transistor and these variations of current are detected as a gate voltage shift of the current peak position corresponding to the states in the two Cooper pair boxes.

6. The quantum-state readout circuit according to claim 1, further comprising a detecting circuit which is connected to the gate electrode to detect four states of double qubits expressed by 00>, 10>, 01>, and 11>.

7. A quantum-state readout method comprising:
   preparing two Cooper-pair boxes coupled to each other through a capacitor or an inductor, two capacitors that have different capacitances, and a single-electron transistor that is coupled to the two Cooper-pair boxes through the respective capacitors and that has an island electrode and a gate electrode adjacent to the island electrode, each of the two Cooper-pair boxes involving two charge states;
   detecting a peak of an electrical current flowing from each of the Cooper-pair boxes to the island electrode of the single electron transistor through each of the two capacitors; and
   converting the peak of the electrical current into a shift in a gate voltage at the gate electrode of the single electron transistor to read out the charge states of the two Cooper-pair boxes.

* * * * *